United States Patent Office 3,055,864
Patented Sept. 25, 1962

3,055,864
POLYSILOXANE ESTERS OF HYDROGENATED BISPHENOL A
Paul M. Kerschner, Mercerville, N.J., and Albert I. Meyers, New Orleans, La., assignors to Cities Service Research and Development Company, New York, N.Y., a corporation of New Jersey
No Drawing. Filed Feb. 26, 1960, Ser. No. 11,152
13 Claims. (Cl. 260—46.5)

This invention relates to polyesters and more particularly to carbon functional organosiloxane polyesters of hydrogenated bisphenol A.

In its broadest aspect this invention relates to new carbon functional organosiloxane polyesters of hydrogenated bisphenol prepared by reacting a carbon functional organosiloxane dibasic acid with a hydrogenated bisphenol A and an excess of a monoalcohol. These new polyesters, because of their unique physical characteristics may be used as plasticizers or hydraulic fluids and when prepared as described hereinafter are particularly suitable as synthetic lubricants.

The new compounds of the present invention correspond to the follow structure:

wherein $n$ is an integer from 1 to 4, R is a monovalent aliphatic hydrocarbon radical having from 3 to 18 carbon atoms; A is the divalent radical

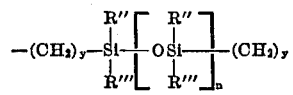

wherein R" and R''' are alike or different and are selected from the group consisting of alkyl radical having from 1 to 12 carbon atoms, aryl, alkylaryl and aralkyl, $y$ has a value from 2 to 5, $n'$ is an integer from 1 to 8; and R' is the divalent radical

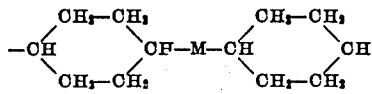

wherein M is selected from the group consisting of —C(CH$_3$)$_2$—, —CH(CH$_3$)CH$_2$—, CH(C$_2$H$_5$)—, and C$_3$H$_6$.

In the foregoing structure R represents the residue of a monoalcohol having from 3 to 18 carbon atoms which may be in a straight, branched or cyclic configuration. Preferably the alcohol used will be of the aliphatic type and can be selected from the following alcohols which have been found suitable for preparing these new polyesters: propyl, isopropyl, butyl, isobutyl, tertiary butyl, amyl, isoamyl, tertiary amyl, hexyl, 2-ethylbutyl, 2-ethylhexyl, heptyl, octyl, the C$_8$ "oxo" alcohols, nonyl, decyl, undecyl, dodecyl, tridecyl, tetradecyl, pentadecyl, hexadecyl, heptadecyl and octadecyl.

As previously defined in the foregoing formula, A represents the divalent radical obtained from the polysiloxane dibasic acid. These acids are known to those skilled in the art and may be prepared by subjecting a chlorinated alkyl disiloxane to the malonic ester synthesis followed by hydrolysis and decarboxylation. The siloxane grouping appearing in the brackets in the divalent acid residue radical may be increased by treating a disiloxane ester with concentrated sulfuric acid in the presence of octamethylcyclotetrasiloxane. This method of expanding the siloxane center of the dibasic acid is more specifically described in JACS 75, 6337 (1953). The R" and R''' substituents in the polysiloxane grouping can be varied and may include alkyl radicals having not more than 12 carbon atoms, aryl, alkylaryl having not more than 12 carbon atoms and aralkyl having not more than 12 carbon atoms. These substituents may be alike or different from the substituents on the silane radical. As previously defined $n'$ has a value of from 1 to 8 which value is determined by treating the desired disiloxane ester compound as described above. When polyesters of this invention are being prepared for use as synthetic lubricants it is preferred that the upper limit values for $n'$ and the carbon content of the substituents represented by R" and R''' not be exceeded since final polyester structures prepared with groupings exceeding the stated limits will have molecular weights and viscosities unsuitable for lubricant purposes. With respect to the dibasic acid preparation a more complete description will be found in JACS 78, 2010 (1956).

The divalent radical of the foregoing structure identified as R' is the residue of the selected hydrogenated bisphenol A. Hydrogenated bisphenols suitable for the purpose of the present invention include 2,2(bis-4-hydroxycyclohexyl) propane, 1,2(bis-4-hydroxycyclohexyl) propane, 1,1(bis-4-hydroxycyclohexyl) propane and 1,3-(bis-4-hydroxycyclohexyl) propane. The structure of the divalent residue of the bisphenol represented by R' has the following structure—

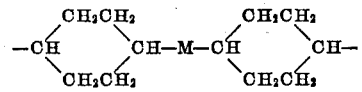

in which M is selected from the group consisting of

—C(CH$_3$)$_2$—, —CH$_2$CH(CH$_3$)—, —CH(C$_2$H$_5$)—, and C$_3$H$_6$

For convenience in the specification and in the claims hereafter, the residue identified by R' will be written as DMD in which D represents the saturated cyclohexyl ring

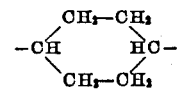

To prepare the new compounds of the present invention the dicarboxylic acid selected is reacted with the selected hydrogenated bisphenol in a molar ratio of acid to diol of 1.25:1 to 2:1 under esterification conditions with water being removed to form a polyester product. Limitation or chain termination of the polyester is accomplished by esterifying the intermediate product of the diacid-diol reaction with a monoalcohol which is added in at least a stoichiometric quantity or in slight excess of from 5 to 10% to insure complete chain termination.

The esterification reaction is generally carried out by refluxing the reactants in a flask or vessel equipped with a reflux condenser and a water-trap. The latter provides a means for removing water of esterification from the reaction zone. The removal of water is accomplished by using an azeotrope forming solvent such as toluene, benzene, xylene, or the like. Depending on the quantities of reactants used, esterification can be completed in from 1 to 6 hours when reflux is carried out at a temperature of between about 80° C. and 120° C. Reflux temperature is determined by the particular solvent used to form the azeotrope. An acid catalyst is used to improve the rate of esterification and suitable for this purpose are sulfuric acid, phosphoric acid, p-toluene sulfonic acid, hydrogen chloride, thionyl chloride, acetyl chloride, boron trifluoride, and trifluoroacetic acid.

In carrying out the reaction the diacid and diol are first esterified in the presence of the azeotrope forming solvent and a catalytic amount of acid catalyst. Reflux is carried out until the theoretical amount of water of esterification is recovered in the water trap. This amount of water would, of course, depend on the molar quantities of the reactants used. After recovery of the theoretical amount of water, a stoichiometric amount or slight excess of the monoalcohol is added to the reaction mixture and reflux is again carried out until a further theoretical amount of water is recovered. After esterification with the chain terminating monoalcohol is complete the reaction mixture is cooled, washed with water, washed with a 10% sodium carbonate solution, and again washed with water to remove any free acid present. The solvent and excess alcohol are then distilled from the reaction mixture at a reduced pressure.

The examples which follow will more clearly describe the manner in which these new polyesters may be prepared.

EXAMPLE 1

Into a 100 ml., three neck, round-bottom flask provided with a mechanical stirrer, a reflux condenser fitted with a water trap, and a thermometer, 55.6 gm. (0.2 mol) of 4,4,6,6-tetramethyl-4,6 disila-5-oxanonanedioic acid are added. To this acid 24.0 gm. (0.1 mol) of 2,2(bis-4-hydroxycyclohexyl) propane are added along with 1 gm. of p-toluene sulfonic acid catalyst and 250 cc. of toluene. The mixture is agitated vigorously and the temperature increased by external heating until refluxing begins. The reaction is continued at the reflux temperature until approximately 3.6 ml. of water are recovered in the water trap; this usually takes 4 to 6 hours. After esterification is essentially complete, 19.5 gm. (0.22 mol) of n-amyl alcohol are added to the flask and refluxing is again brought about by external heating.

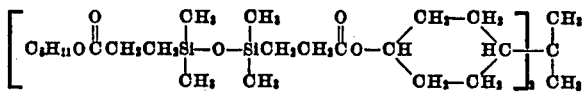

An additional 3.6 ml. of water are recovered. Unreacted alcohol and solvent are removed from the reaction system by distillation at atmospheric pressure. The crude ester product remaining, after solvent and alcohol removal, is washed with water, 10% sodium carbonate, and again with water to remove unreacted acids. The final product is recovered by distillation at a pressure of about 0.5 to 1.0 mm. Hg. The recovered product is of the following formula

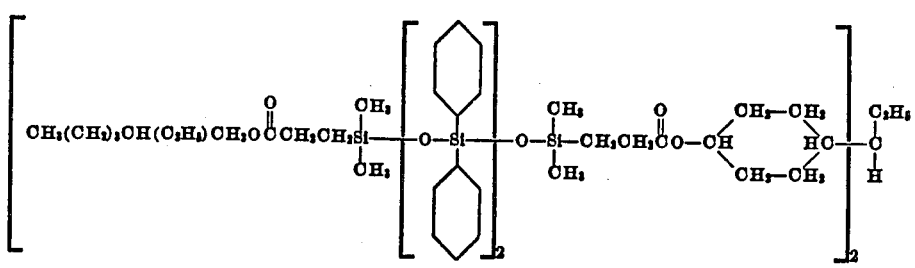

The product has the following chemical and physical characteristics.

| | |
|---|---|
| Sap. No | 378 |
| Si, percent | 8.83 |
| Vis., cs.: | |
| 100° F | 46.79 |
| 210° F | 8.12 |
| V.I | 139.5 |
| Pour pt., °F | −65 |
| Flash pt., °F | 505 |
| Fire pt., °F | 550 |

EXAMPLE 2

To 55.6 gm. (0.2 mol) 4,4,6,6-tetramethyl-4,6-disila-5-oxanonanedioic acid, 24.0 gm. (0.1 mol) 1,1-(bis-4-hydroxycyclohexyl) propane are added, using the apparatus described in Example 1. Toluene (250 ml.) and 1 gm. p-toluene sulfonic acid catalyst are added to the system and esterification is carried out according to the method described in Example 1. After esterification is essentially complete as indicated by recovering the theoretical amount of water, 20.0 gm. (0.2 mol) of cyclohexanol is added. Refluxing is again carried on until esterification is complete. The product, recovered in the manner described in Example 1, is of the following formula:

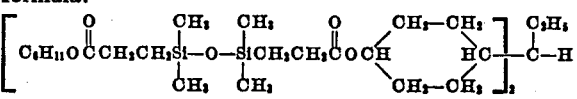

EXAMPLE 3

To 70.4 gm. (0.2 mol) 4,4,6,6,8,8-hexamethyl-4,6,8-trisila-5,7-dioxaundecanedioic acid, 24.0 gm. (0.1 mol) 2,2(bis-4-hydroxycyclohexyl) propane is added, using the apparatus described in Example 1. Toluene (250 ml.) and 1 gm. p-toluene sulfonic acid catalyst are added to the system and esterification is carried out according to the method described in Example 1. After esterification is essentially complete as indicated by recovering the theoretical amount of water, 26.0 gm. (0.2 mol) of 2-ethylhexanol is added. Refluxing is again carried on until esterification is complete. The product is recovered in the manner described in Example 1 and is of the formula

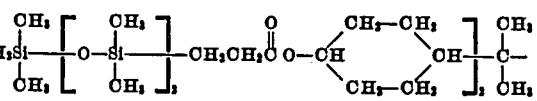

EXAMPLE 4

To 134.8 gm. (0.2 mol) 4,4,10,10-tetramethyl-6,6,8,8-tetraphenyl-4,6,8,10-tetrasila-5,7,9-trioxatridecandioic acid, 24.0 gm. (0.1 mol) 1,1-(bis-4-hydroxycyclohexyl) propane is added, using the apparatus described in Example 1. Toluene (250 ml.) and 1 gm. p-toluene sulfonic acid catalyst are added to the system and esterification is carried out according to the method described in Example 1. After esterification is essentially complete as indicated by recovering the theoretical amount of water, 26.0 gm. (0.2 mol) 2-ethylhexanol is added. Refluxing is again carried on until esterification is complete. The product is recovered in the manner described in Example 1 and is of the formula

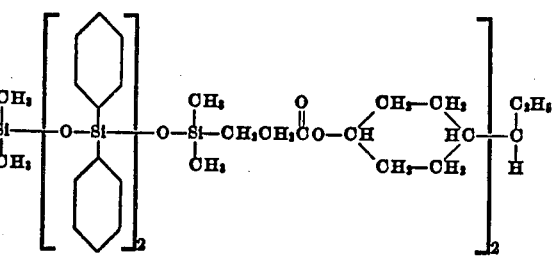

EXAMPLE 5

Following the method of the previous example 55.6 gm. (0.2 mol) 4,4,6,6-tetramethyl-4,6-disila-5-oxanonanedioic acid are reacted with 31.9 gm. (0.13 mole)1,2-(bis-4-hydroxycyclohexyl) propane in the presence of approximately 250 ml. toluene and 1 gm. p-toluene sulfonic acid. After reflux yields 4.9 gm. of water, 13.7 gms. (0.134 mol) 2-ethylbutanol is added and reflux again carried out until esterification is complete. The product is recovered in the manner described in the previous examples and is of the formula

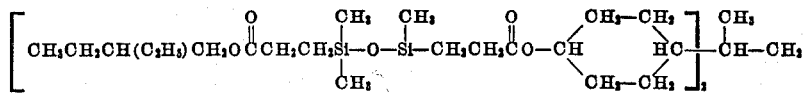

EXAMPLE 6

To 52.0 gm. (0.178 mol) of 4,4,6,6-tetramethyl-4,6-disila-5-oxanonanedioic acid, 28.1 gm. (0.117 mol) of 2,2(bis-4-hydroxycyclohexyl) propane is added, using the apparatus described in Example 1. Toluene (250 ml.) and 1 gm. p-toluene sulfonic acid catalyst are added to the system and esterification is carried out according to the method described in Example 1. After esterification is essentially complete as indicated by recovering the theoretical amount of water, 34.0 gm. (0.26 mol) of 2-ethylhexanol is added. Refluxing is again carried on until esterification is complete. The product is recovered in the manner described in Example 1 and has the following chemical and physical characteristics:

| | |
|---|---|
| Sap. No | 198 |
| Si, percent | 11.0 |
| Vis., cs.: | |
| 100° F | 184.8 |
| 210° F | 20.62 |
| V.I | 124.0 |
| Pour pt., °F | −35 |
| Flash pt., °F | 515 |
| Fire pt., °F | 570 |

EXAMPLE 7

To 70.4 gm. (0.2 mol) 4,4,6,6,8,8-hexamethyl-4,6,8-trisila-5,7-dioxaundecanedioic acid, 24.0 gm. 1,3(bis-4-hydroxycyclohexyl) propane is added, using the apparatus described in Example 1. Toluene (250 ml.) and 1 gm. p-toluene sulfonic acid catalyst are added to the system and esterification is carried out according to the method described in Example 1. After esterification is essentially complete as indicated by recovering the theoretical amount of water, 31.6 gm. (0.2 mol) decanol is added. Refluxing is again carried on until esterification is complete. The product is recovered in the manner described in Example 1 and is of the formula

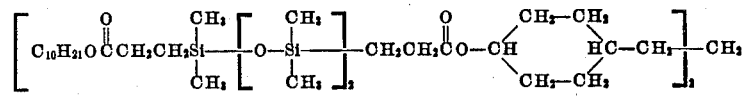

EXAMPLE 8

To 55.6 gm. (0.2 mol) 4,4,6,6-tetramethyl-4,6-disila-5-oxanonanedioic acid, 24.0 gm. (0.1 mol) 1,2(bis-4-hydroxycyclohexyl) propane is added, using the apparatus described in Example 1. Toluene (250 ml.) and 1 gm. p-toluene sulfonic acid catalyst are added to the system and esterification is carried out according to the method described in Example 1. After esterification is essentially complete as indicated by recovering the theoretical amount of water, 26.0 gm. (0.2 mol) of the mixed $C_8$ oxo alcohols is added. Refluxing is again carried on until esterification is complete. The product is recovered in the manner described in Example 1 and is of the formula

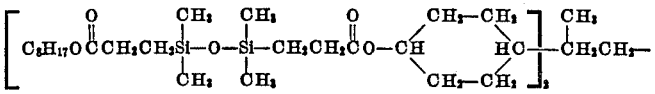

EXAMPLE 9

To a one liter flask of the type described in Example 1, 70.4 gm. (0.2 mol) of 4,4,6,6,8,8-hexamethyl-4,6,8-trisila-5,7-dioxaundecanedioic acid are added. To this acid 24.0 gm. (0.1 mol) of 1,1 (bis-4-hydroxycyclohexyl)propane are added along with 1 gm. of p-toluene sulfonic acid catalyst and 250 cc. of toluene. The mixture is agitated vigorously and the temperature increased by external heating until refluxing begins. After esterification is essentially complete, 26.0 gm. (0.2 mol) of $C_8$ "oxo" alcohols are added to the flask and refluxing is again brought about by external heating. Unreacted alcohol and solvent are removed from the reaction system by distillation at atmospheric pressure. The crude ester product is washed with water, 10% sodium carbonate and again with water to remove unreacted acids. The final product is recovered by distillation at a pressure of about 0.5 to 1.0 mm. Hg and is of the formula

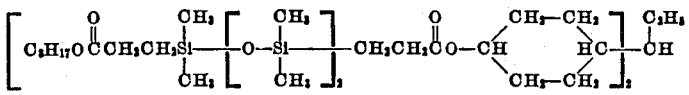

EXAMPLE 10

According to the procedures previously described, 100 gm. (0.2 mol) of 4,4,6,6,8,8,10,10,12,12-decamethyl-4,6,8,10,12-pentasila-5,7,9,11-tetraoxapentadecandioic acid are reacted with 24.0 gm. (0.1 mol) of 2,2 (bis-4-hydroxycyclohexyl) propane. After esterification is complete, 31.6 gm. (0.2 mol) of decanol are added to the product. The final product is washed and recovered by distillation and is of the formula

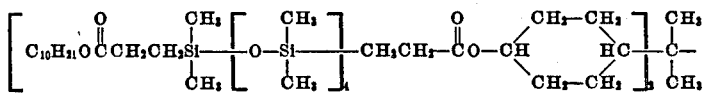

EXAMPLE 11

According to the procedures previously described, 55.6 gm. (0.2 mol) of 4,4,6,6-tetramethyl-4,6-disila-5-oxanonanedioic acid are reacted with 24.0 gm. (0.1 mol) of 1,2 (bis-4-hydroxycyclohexyl) propane. After the esterification is complete, 31.6 gm. (0.2 mol) of decanol are added. The final product is recovered as described previously.

EXAMPLE 12

To a flask of the type described in Example 1, 55.6 gm. (0.2 mol) 4,4,6,6-tetramethyl-4,6-disila-5-oxanonanedioic acid are added. To this acid 31.9 gm. (0.133 mol) of 1,3 (bis-4-hydroxycyclohexyl) propane are added along with 1 gm. of p-toluene sulfonic acid catalyst and 250 cc. of toluene. The mixture is agitated vigorously and the temperature increased by external heating until refluxing begins. The reaction is continued at the reflux temperature until esterification is complete. 17.4 gm. (0.134-mol) of 2-ethylhexanol are added to the reaction product and refluxing is resumed. The crude ester product is washed with water, 10% sodium carbonate, and water. The final product is recovered by distillation at a pressure of about 0.5 to 1.0 mm. Hg.

EXAMPLE 13

According to the procedures described in Example 1, 70.4 gm. (0.2 mol) of 4,4,6,6,8,8-hexamethyl-4,6,8-trisila-5,7-dioxaundecanedioic acid are reacted with 31.9 gm. (0.133 mol) of 1,2 (bis-4-hydroxycyclohexyl) propane. Upon completion of the esterification reaction, 19.2 gm. (0.133 mol) nonanol are added. The final product is recovered as described.

EXAMPLE 14

According to the procedures of Example 1, 61.2 gm. (0.2 mol of 5,5,7,7-tetramethyl-5,7 disila-6-oxaundecandioic acid are reacted with 24.0 gm. (0.1 mol) of 2,2 (bis-4-hydroxycyclohexyl) propane. Upon completion of the esterification reaction, 26.0 gm. (0.2 mol) plete, 0.2 mol of heptanol are added. The final product recovered as described.

EXAMPLE 15 5

According to the procedures described, 0.2 mol of 7,7,9,9-tetramethyl-7,9-disila - 8 - oxapentadecandioic acid are reacted with 0.1 mol of 2,2 (bis-4-hydroxycyclohexyl) propane. After esterification is substantially complete, 0.2 mols of heptanol are added. The final product is recovered as described and is of the formula:

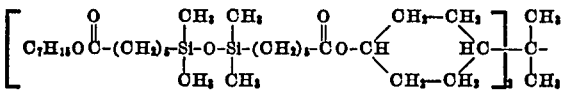

As has been previously indicated the new polyesters of the present invention when prepared according to the method described and within the structural limits defined by the general formula possess properties and characteristics making them particularly suitable for lubricating purposes as synthetic lubricants. The excellent lubricating properties of these new polyesters are shown in the data of the tables which follow in which the wear properties of the polyesters prepared according to Example 6 and Example 1 respectively were evaluated in the standard Shell 4 ball test. This test is based on the use of an apparatus that includes 3 rigidly held ½" metal balls (type 52-100 steel balls) submerged in the lubricant to be tested in a metal cup. A 4th ball of the same size and material is pressed into contact with the 3 fixed balls by an adjustable loading arm and allowed to rub over a fixed period of time. The contact points on the 3 stationary balls grow to circular scars as wear progresses. The average diameter of these scars in millimeters after the fixed period of operation at a particular speed and load is taken as a measure of wear.

The temperature at which the test is carried out may be varied from room temperature to as high as 170° C.

Table 1

COMPARISON OF WEAR PROPERTIES OF CARBON-FUNCTIONAL ORGANOSILICON ESTERS WITH PETROLEUM OIL AND WITH COMMERCIAL "A" SILICONE FLUID

| Sample No. | Scar diameter in mm. | | |
|---|---|---|---|
| | Example 6 | 100 neutral mineral oil | Silicone |
| Load, kg.: | | | |
| 1 | .20 | 0.26 | 0.67 |
| 5 | .22 | 0.38 | 1.5 |
| 20 | .50 | 0.86 | |

Extreme Pressure—Wear

| Sample No. | Scar diameter in mm. | | |
|---|---|---|---|
| | Example 6 | 100 neutral mineral oil | Silicone |
| Load, kg.: | | | |
| 110 | .50 | 2.3 | 2.6 |
| 110 | Weld | | |
| Seizure—Load, kg | 110.0 | 50 | 60 |

| Sample No. | Scar diameter in mm. | | |
|---|---|---|---|
| | Example 1 | 100 neutral mineral oil | Silicone |
| Load, kg.: | | | |
| 1 | 0.50 | 0.26 | 0.67 |
| 5 | 0.70 | 0.38 | 1.5 |
| 10 | | 0.75 | 2.7 |
| 20 | 1.05 | 0.86 | |

Extreme Pressure—Wear

| Sample No. | Scar diameter in mm. | | |
|---|---|---|---|
| | Example 1 | 100 neutral mineral oil | Silicone |
| Load, kg.: | | | |
| 40 | | 0.36 | 0.65 |
| 60 | | 1.9 | 1.1 |
| 80 | | 1.6 | 1.8 |
| 100 | 0.90 | 2.3 | 2.6 |
| 120 | 2.55 | | |
| Seizure—Load, kg | 110 | 50 | 60 |

In the foregoing table the neutral mineral oil is a standard base oil having an API gravity of 32 (min.); specific gravity (max.) 0.8654; flash, COC, ° F. (min.) 380; fire, CCC, ° F. (min.) 430; viscosity—SUS at 100° F. 100-110; at 210° F. 40; V.I range (min.) 95, and pour point, ° F. (max.) 0. The silicone oil is a commercially available polymethyl siloxane oil manufactured by Dow Corning Company under the name "200 fluid." It will be noted that the polyester of the present invention possesses superior wear properties to that of either the conventional mineral or commercially available silicone oil both in the wear and extreme pressure tests. The excellent viscosity characteristics coupled with the molecular weights, flash, fire and pour point values for these polyesters make them particularly suitable for use as lubricants.

While this invention has been described with some degree of particularity with respect to the structures of the compounds used and the method by which these polyesters are prepared, it is to be understood that the only limitations on the scope of the invention to be applied are those imposed by the scope of the claims appended hereto.

We claim:
1. A new composition of matter, a polyester having the formula

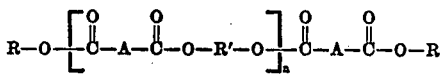

wherein $n$ is an integer from 1 to 4, R is a monovalent aliphatic hydrocarbon radical having from 3 to 18 carbon atoms, A is the divalent radical

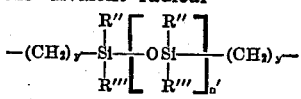

wherein R'' and R''' are selected from the group consisting of alkyl, aryl, aralkyl, and alkaryl, radicals having not more than 12 carbon atoms, $y$ has a value from 2 to 5, $n'$ has a value of from 1 to 8, and R' is the divalent radical —DMD— wherein D represents

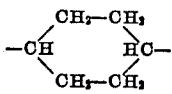

and M is selected from the group consisting of —C(CH$_3$)$_2$—, —CH(CH$_3$)CH$_2$—, —CH(C$_2$H$_5$)— and —C$_3$H$_6$—.

2. A new composition of matter as claimed in claim 1 wherein

R is —C$_5$H$_{11}$
A is —(CH$_2$)$_2$Si(CH$_3$)$_2$OSi(CH$_3$)$_2$(CH$_2$)$_2$
R' is —DC(CH$_3$)$_2$D—, and
$n$ is 1

3. A new composition of matter as claimed in claim 1 wherein

R is CH$_3$(CH$_2$)$_3$CH(C$_2$H$_5$)CH$_2$—
A is —(CH$_2$)$_2$Si(CH$_3$)$_2$OSi(CH$_3$)$_2$(CH$_2$)$_2$—
R' is —DC(CH$_3$)$_2$D— and
$n$ is 2

4. A new composition of matter is claimed in claim 1 wherein

R is CH$_3$(CH$_2$)$_3$CH(C$_2$H$_5$)CH$_2$—
A is (CH$_2$)$_2$Si(CH$_3$)$_2$OSi(CH$_3$)$_2$OSi(CH$_3$)$_2$(CH$_2$)$_2$—
R' is —DC(CH$_3$)$_2$D— and
$n$ is 1

5. A new composition of matter as claimed in claim 1 wherein

R is CH$_3$(CH$_2$)$_3$CH(C$_2$H$_5$)CH$_2$—
A is —(CH$_2$)$_2$Si(CH$_3$)$_2$OSi(C$_6$H$_5$)$_2$OSi(C$_6$H$_5$)$_2$OSi(CH$_3$)$_2$(CH$_2$)$_2$—
R' is —DCH(C$_2$H$_5$)D— and
$n$ is 1

6. A new composition of matter as claimed in claim 1 wherein

R is CH$_3$CH$_2$CH(C$_2$H$_5$)CH$_2$—
A is —(CH$_2$)$_2$Si(CH$_3$)$_2$OSi(CH$_3$)$_2$(CH$_2$)$_2$—
R' is —DCH(CH$_3$)CH$_2$D— and
$n$ is 2

7. A new composition of matter as claimed in claim 1 wherein

R is C$_6$H$_{11}$
A is —(CH$_2$)$_2$Si(CH$_3$)$_2$OSi(CH$_3$)$_2$(CH$_2$)$_2$—
R' is —DCH(C$_2$H$_5$)D— and
$n$ is 1

8. A new composition of matter as claimed in claim 1 wherein

R is C$_{10}$H$_{21}$
A is —(CH$_2$)$_2$Si(CH$_3$)$_2$OSi(CH$_3$)$_2$OSi(CH$_3$)$_2$(CH$_2$)$_2$—
R is —DC$_3$H$_6$D— and
$n$ is 1

9. A new composition of matter as claimed in claim 1 wherein

R is C$_8$H$_{17}$
A is (CH$_2$)$_2$Si(CH$_3$)$_2$OSi(CH$_3$)$_2$(CH$_2$)$_2$—
R' is —DCH(CH$_3$)CH$_2$D— and
$n$ is 1

10. A new composition of matter, a polyester having the formula

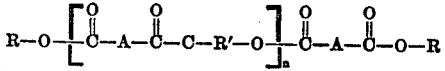

wherein $n$ is an integer from 1 to 4, R is a monovalent aliphatic hydrocarbon radical having from 3 to 18 carbon atoms, A is the divalent radical

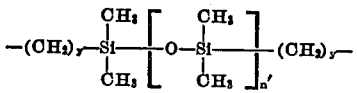

wherein $y$ is an integer from 2 to 5, $n'$ is an integer from 1 to 8, and R' is the divalent radical —DMD— wherein D represents

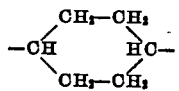

and M is selected from the group consisting of —C(CH$_3$)$_2$—, CH(CH$_3$)CH$_2$—, —CH(C$_2$H$_5$)— and —CH$_3$H$_6$—.

11. A new composition of matter as claimed in claim 10 wherein

R is C$_8$H$_{17}$
A is —(CH$_2$)$_2$Si(CH$_3$)$_2$OSi(CH$_3$)$_2$(CH$_2$)$_2$—
R' is —DCH(C$_2$H$_5$)D—
$n$ is 1

12. A new composition of matter as claimed in claim 10 wherein

R is C$_{10}$H$_{21}$
Y is 2
$n'$ is 4
R' is —DC(CH$_3$)$_2$—D—
$n$ is 1

13. A new composition of matter as claimed in claim 10 wherein

R is C$_7$H$_{15}$
A is —(CH$_2$)$_5$Si(CH$_3$)$_2$OSi(CH$_3$)$_2$(CH$_2$)$_5$—
R' is —DC(CH$_3$)$_2$D—
$n$ is 1

References Cited in the file of this patent
UNITED STATES PATENTS
2,916,507   Kerschner et al. _____ Dec. 8, 1959

UNITED STATES PATENT OFFICE
CERTIFICATE OF CORRECTION

Patent No. 3,055,864                      September 25, 1962

Paul M. Kerschner et al.

It is hereby certified that error appears in the above numbered patent requiring correction and that the said Letters Patent should read as corrected below.

Column 1, line 24, for "follow" read -- following --; columns 5 and 6, lines 3 to 7, the formula should appear as shown below instead of as in the patent:

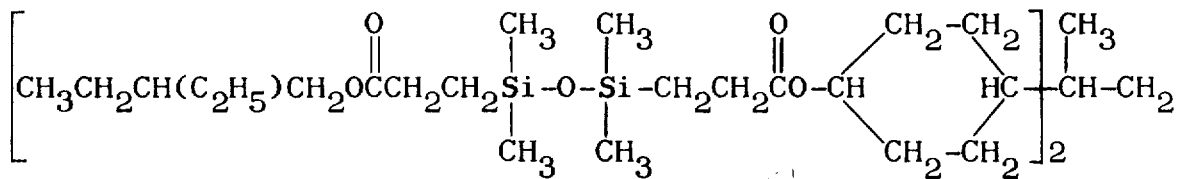

column 7, line 37, for "plete, 0.2 mol of heptanol" read -- of $C_8$ "oxo" alcohols --; line 40, for "EXAMPLE 15 5" read -- EXAMPLE 15 --; column 10, lines 16 to 18, the formula should appear as shown below instead of as in the patent:

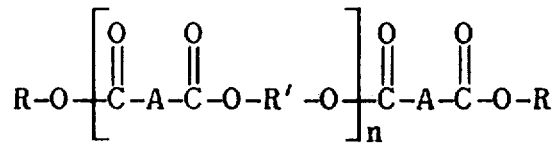

same column 10, line 35, for "-$CH_3H_6$-" read -- -$C_3H_6$- --.

Signed and sealed this 26th day of February 1963.

(SEAL)
Attest:

ESTON G. JOHNSON                      DAVID L. LADD
Attesting Officer                   Commissioner of Patents